(12) United States Patent
Chen

(10) Patent No.: US 12,550,182 B2
(45) Date of Patent: Feb. 10, 2026

(54) RANDOM ACCESS METHOD AND APPARATUS, TERMINAL, AND READABLE STORAGE MEDIUM

(71) Applicant: VIVO MOBILE COMMUNICATION CO., LTD., Dongguan (CN)

(72) Inventor: Li Chen, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 428 days.

(21) Appl. No.: 18/123,326

(22) Filed: Mar. 19, 2023

(65) Prior Publication Data

US 2023/0232459 A1    Jul. 20, 2023

Related U.S. Application Data

(63) Continuation of application No. PCT/CN2021/121244, filed on Sep. 28, 2021.

(30) Foreign Application Priority Data

Sep. 29, 2020    (CN) .......................... 202011053343.6

(51) Int. Cl.
*H04W 72/563*    (2023.01)
*H04W 72/02*    (2009.01)
(Continued)

(52) U.S. Cl.
CPC ......... *H04W 72/563* (2023.01); *H04W 72/02* (2013.01); *H04W 74/0833* (2013.01);
(Continued)

(58) Field of Classification Search
CPC ............... H04W 74/0833–0858; H04W 74/00; H04W 74/002; H04W 74/004;
(Continued)

(56) References Cited

U.S. PATENT DOCUMENTS

2018/0279374 A1\*  9/2018  Sun ........................ H04L 5/0094
2019/0215828 A1\*  7/2019  Kim ....................... H04W 48/08
(Continued)

FOREIGN PATENT DOCUMENTS

CN           103385026 A       11/2013
CN           108024259 A        5/2018
(Continued)

OTHER PUBLICATIONS

Extended European Search Report issued in related European Application No. 21874455.5, mailed Feb. 1, 2024, 9 pages.
(Continued)

*Primary Examiner* — Warner Wong
(74) *Attorney, Agent, or Firm* — IPX PLLC

(57) ABSTRACT

A random access method and apparatus, a terminal, and a readable storage medium are provided. The method includes: selecting a target random access channel (RACH) resource associated with a first reference signal or a second reference signal; and using the target RACH resource to initiate random access, where the first reference signal is a single frequency network (SFN) specific reference signal, and the second reference signal is a cell/transmission reception point (cell/TRP) specific reference signal.

19 Claims, 4 Drawing Sheets

(51) Int. Cl.
*H04W 74/0833* (2024.01)
*H04W 74/0836* (2024.01)
*H04W 74/0838* (2024.01)
*H04W 84/06* (2009.01)

(52) U.S. Cl.
CPC .... *H04W 74/0836* (2024.01); *H04W 74/0838* (2024.01); *H04W 84/06* (2013.01)

(58) Field of Classification Search
CPC ..... H04W 72/00; H04W 72/02; H04W 72/50; H04W 72/56; H04W 72/563; H04W 36/0077; H04L 2025/03783; H04L 12/1243; H04L 12/2856; H04L 2012/5631; H04L 2012/6424; H04L 47/70
See application file for complete search history.

(56) References Cited

U.S. PATENT DOCUMENTS

| | | | | |
|---|---|---|---|---|
| 2019/0373642 | A1* | 12/2019 | Suzuki | H04W 72/0466 |
| 2020/0008244 | A1* | 1/2020 | Suzuki | H04W 74/04 |
| 2020/0053799 | A1 | 2/2020 | Jeon et al. | |
| 2020/0236716 | A1* | 7/2020 | Lei | H04L 5/0051 |
| 2021/0337597 | A1* | 10/2021 | Yoshimura | H04W 74/0833 |
| 2022/0095378 | A1* | 3/2022 | Lei | H04W 74/0836 |
| 2022/0225423 | A1* | 7/2022 | Zhang | H04L 5/0007 |
| 2022/0248475 | A1* | 8/2022 | Lee | H04W 74/0841 |
| 2023/0092926 | A1* | 3/2023 | Fu | H04W 74/006 |
| 2023/0180301 | A1* | 6/2023 | Seidel | H04W 74/006 370/329 |
| 2023/0239767 | A1* | 7/2023 | Chen | H04W 48/20 370/329 |

FOREIGN PATENT DOCUMENTS

| | | |
|---|---|---|
| CN | 110035567 A | 7/2019 |
| WO | 2018084663 A1 | 5/2018 |
| WO | 2018085374 A1 | 5/2018 |
| WO | 2020124380 A1 | 6/2020 |

OTHER PUBLICATIONS

LG Electronics: "RACH Procedure Considering Multi-TRP Operation", 3GPP Draft; R1-1613120; Nov. 2016, 5 pages.
First Office Action issued in related Chinese Application No. 202011053343.6, mailed Jan. 30, 2024, 8 pages.
Catt, "Random access procedure in NR" 3GPP tsg_ran\WG2_RL2, R2-167951, Nov. 2016, 4 pages.
Futurewei, "Enhancement to support HST-SFN deployment scenario" 3GPP tsg_ran\wg1_rl1, R1-2005592, Aug. 2020, 5 pages.
International Search Report issued in corresponding International Application No. PCT/CN2021/121244, mailed Dec. 29, 2021, 4 pages.
NTT Docomo, Inc., "Maintenance for Channel Structure for Two-Step RACH", 3GPP tsg_ran\wg1_rl1, R1-2004381, May 2020, 8 pages.

* cited by examiner

RANDOM ACCESS METHOD AND APPARATUS, TERMINAL, AND READABLE STORAGE MEDIUM

CROSS-REFERENCE TO RELATED APPLICATIONS

This application is a continuation of International Application No. PCT/CN2021/121244, filed Sep. 28, 2021, which claims priority to Chinese Patent Application No. 202011053343.6, filed Sep. 29, 2020. The entire contents of each of the above-referenced applications are expressly incorporated herein by reference.

TECHNICAL FIELD

This application pertains to the field of communications technologies, and in particular, to a random access method and apparatus, a terminal, and a readable storage medium.

BACKGROUND

With the deployment of higher and higher frequency bands in the future communications system, a coverage range of a cell or a transmission reception point (TRP) is getting smaller and smaller. In addition, the future mobile communications system supports more and more diverse application scenarios, including more high-speed scenarios. This brings frequent mobility (including handover (handover) in a connected mode and cell selection/reselection in an idle mode or an inactive mode). Thereby introducing more terminal measurements, which may increase the power consumption of a terminal.

In order to reduce the power consumption of the terminal, cell free or a single frequency network (SFN) will be introduced. Currently, there is no random access method for this scenario.

SUMMARY

Embodiments of this application aim to provide a random access method and apparatus, a terminal, and a readable storage medium.

According to a first aspect, a random access method is provided, where the method is performed by a terminal and includes:
selecting a target random access channel (RACH) resource associated with a first reference signal and/or a second reference signal; and
using the target RACH resource to initiate random access, where
the first reference signal is a single frequency network (SFN) specific reference signal, and the second reference signal is a cell/transmission reception point (cell/TRP) specific reference signal.

According to a second aspect, a random access apparatus is provided, where the apparatus is applied to a terminal and includes:
a selection module, configured to select a target random access channel (RACH) resource associated with a first reference signal and/or a second reference signal; and
an access module, configured to use the target RACH resource to initiate random access, where
the first reference signal is a single frequency network (SFN) specific reference signal, and the second reference signal is a cell/transmission reception point (cell/TRP) specific reference signal.

According to a third aspect, a terminal is provided, where the terminal includes a processor, a memory, and a program or an instruction stored in the memory and executable on the processor, and when the program or the instruction is executed by the processor, steps of the random access method according to the first aspect are implemented.

According to a fourth aspect, a readable storage medium is provided, where the readable storage medium stores a program or an instruction, and when the program or the instruction is executed by a processor, steps of the random access method according to the first aspect are implemented.

According to a fifth aspect, a chip is provided, where the chip includes a processor and a communications interface, the communications interface is coupled to the processor, and the processor is configured to run a program or an instruction of a network side device, to implement steps of the random access method according to the first aspect.

According to a sixth aspect, a program product is provided, where the program product is stored in a non-volatile storage medium, and the program product is executed by at least one processor to implement steps of the random access method according to the first aspect.

In the embodiments of this application, random access is initiated by using the RACH resource associated with the SFN specific reference signal and/or the cell/TRP specific reference signal, which can realize fast access of the RACH and effectively reduce power consumption of the terminal.

DETAILED DESCRIPTION

Figure 1A:
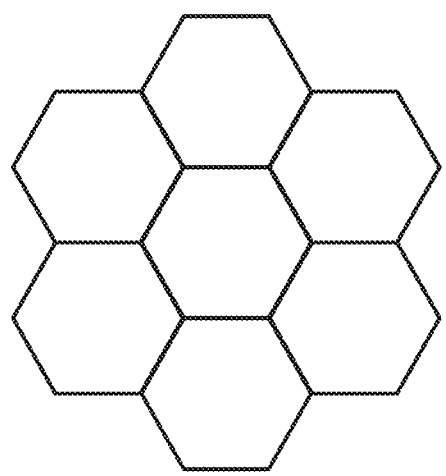
FIG. 1a is a schematic diagram of an SFN architecture.

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

In the specification and claims of this application, the terms "first", "second", and the like are intended to distinguish between similar objects but do not describe a specific order or sequence. It should be understood that, data termed in such a way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the specification and the claims, "and/or" represents at least one of connected objects, and a character "/" generally represents an "or" relationship between associated objects.

It should be noted that the technology described in the embodiments of this application is not limited to a Long Term Evolution (LTE)/LTE-Advanced LTE-A) system, and may also be used in other wireless communications systems such as Code Division Multiple Access (CDMA), Time Division Multiple Access TDMA), Frequency Division Multiple Access (FDMA), Orthogonal Frequency Division Multiple Access OFDMA), Single-carrier Frequency-Division Multiple Access SC-FDMA), and another system. The terms "system" and "network" in the embodiments of this application may be used interchangeably. The technologies described can be applied to both the systems and the radio technologies mentioned above as well as to other systems and radio technologies. However, a New Radio (NR) system is described below as an example, and the term NR is used in most of the descriptions, although these technologies can also be used in an application other than an application of the NR system, for example, a 6th Generation (6G) communication system.

In the embodiments of this application, the terminal may also be referred to as a terminal device or User Equipment (UE). The terminal may be a terminal side device such as a mobile phone, a tablet personal computer, a laptop computer or a notebook computer, a Personal Digital Assistant (PDA), a palmtop computer, a netbook, an ultra-mobile personal computer UMPC), a mobile Internet device (MID), a wearable device, vehicle user equipment (VUE), or pedestrian user equipment (PUE). The wearable device includes a bracelet, a headset, glasses, and the like. It should be noted that a specific type of the terminal is not limited in the embodiments of this application. The network side device may be a base station. The base station may be referred to as a NodeB, an evolved NodeB, an access point, a Base Transceiver Station (BTS), a radio base station, a radio transceiver, a Basic Service Set (BSS), an Extended Service Set (ESS), a NodeB, an evolved NodeB (eNB), a home NodeB, a home evolved NodeB, a WLAN access point, a WiFi node, a Transmitting Receiving Point (TRP), or another appropriate term in the art. As long as a same technical effect is achieved, the base station is not limited to a specified technical term. It should be noted that, in the embodiments of this application, only a base station in an NR system is used as an example, but a specific type of the base station is not limited.

To better understand the scheme provided in this application, the following contents are first described:

Introduction of the Single Frequency Network (SFN):

SFN transmission scheme: a plurality of cells or a plurality of transmission points send same signals, there is no co-channel interference between different cells, and the plurality of signals can improve a Signal to Interference plus Noise Ratio (SINR), transmission quality, and a coverage effect. A plurality of cells forming the SFN may share one cell ID, that is, an ID of a super cell. The plurality of cells may send signals through SFN transmission. For example, each cell sends a wide beam, and a terminal may receive wide beams sent from the plurality of cells at a moment, thereby obtaining a diversity gain. In the SFN transmission scheme, the terminal does not need to perform frequent cell reselection or handover between cells.

Referring to FIG. 1a, FIG. 1a shows an SFN super cell with 7 cells.

IDLE or INACTIVE UE Mobility:

In a moving process of IDLE or INACTIVE UE, the network provides a priority of each frequency point.

For an intra-frequency neighboring cell, if a measurement evaluation value (calculated by adding an offset to a measurement result of the target (or neighboring) cell) of a target (or neighboring) cell is better than a measurement evaluation value (calculated by adding an offset to a measurement result of a serving cell) of the serving cell, the measurement evaluation value of the target (or neighboring) cell lasts for a period of time (for example, a network configuration duration), and the UE camps on the current serving cell for more than the period of time (for example, 1 s as specified in the protocol), the UE reselects to the target (or neighboring) cell.

For a high-priority inter-frequency or inter-RAT neighboring cell, if the measurement evaluation value of the target (or neighboring) cell exceeds a threshold and lasts for a period of time (for example, the network configuration duration), the UE reselects to the target (or neighboring) cell.

For a low-priority inter-frequency or inter-RAT neighboring cell, if the measurement evaluation value of the target (or neighboring) cell is greater than the threshold, the measurement evaluation value of the current serving cell is less than the threshold, and the measurement evaluation value of the target (or neighboring) cell lasts for a period of time (for example, the network configuration duration), the UE reselects to the target (or neighboring) cell.

For an inter-frequency or inter-RAT neighboring cell, when a priority of a target (or neighboring) frequency point is the same as that of a current serving (or camping) frequency point, a cell reselection method is the same as that of the intra-frequency cell.

The IDLE/INACTIVE UE triggers a connection establishment process by receiving paging sent by a network side, so as to send and receive data.

Figure 1B:
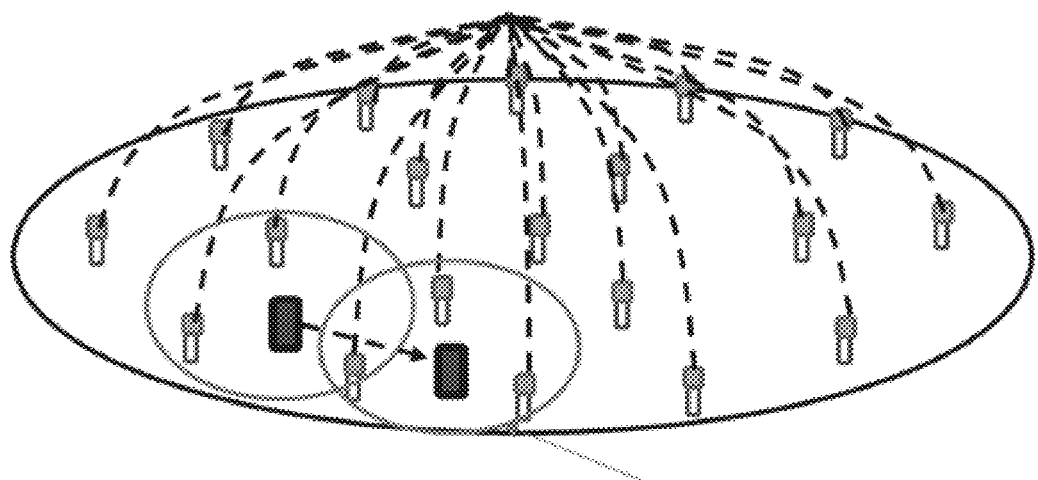
FIG. 1b is a schematic diagram of a dense network architecture.

Cell Free or Dense Network:

Referring to FIG. 1b, a low frequency (for example, an FR 1) cell has a larger coverage than a high frequency (for example, an FR 2) cell.

When the terminal moves within the coverage area of the FR 1, the FR 2 cell may be changed continuously, but the FR 1 cell is not changed.

When initially activating an FR 2 cell or being handed over to an FR 2 cell, the terminal needs to continuously measure signal quality of each beam, which may lead to an excessively long cell activation time or cell handover time due to a relatively large quantity of beams. For example, when a specific condition is met, the measurement time may reach a second level, as follows:

$$8 \quad ms + 24 * T_{1S} + T_{uncertainty\_MAC} + T_{LI-RSRP,measure} + T_{LI-RSRP,report} + T_{HARQ} + T_{FineTiming},$$

The foregoing relatively long measurement time may also result in higher power consumption of the UE.

Introduction to the Separation of a Centralized Unit (CU) and a Distributed Unit (DU):

In the 5G system, the base station (gNB) may put protocol stack entities thereof on different control units. For example, Radio Resource Control (RRC) and Packet Data Convergence Protocol (PDCP) are placed on the CU, and Radio Link Control (RLC) and Media Access Control (MAC)/Physical Layer (PHY) are placed on the DU. The CU and the DU have specific radio resource management rights. For example, the CU may manage a connected cell thereof through an RRC message, and the DU may manage a connected cell thereof through an MACCE message. A plurality of DUs are connected to one CU, while the CU is connected to the core network and another CU.

Basic Process of Terminal System Access:

1. Initial network search: including synchronizing Synchronization Signal Block (SSB) and receiving system information. In some embodiments, Primary Synchronization Signals (PSS) are received first, then Secondary Synchronization Signals (SSS) are received, and then a Physical Broadcast Channel (PBCH) is received: obtaining an SSB index and information in a PBCH RMRS and a master information block (MIB).

2. Broadcasting system information (SI) is received based on the obtained information, which includes information required for an access system.

3. Random access is performed based on the information required for system access.

Figure 1C:
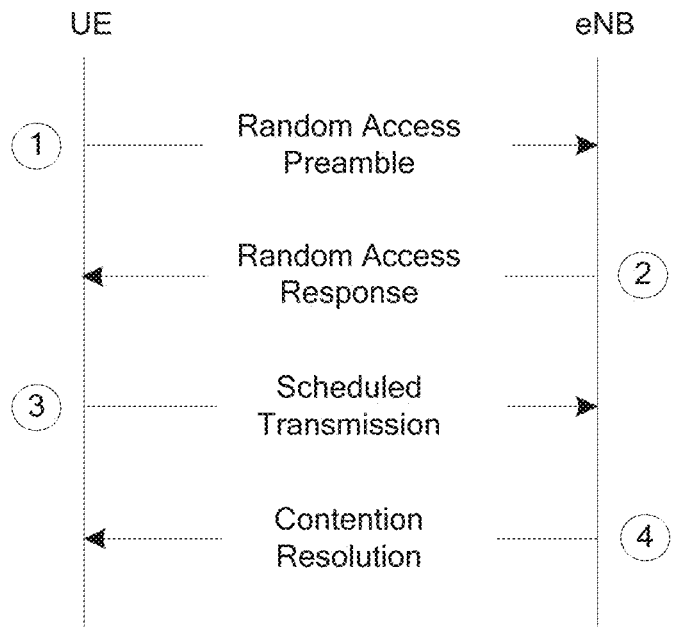
FIG. 1c is a schematic flowchart of contention-based random access.
Figure 1D:
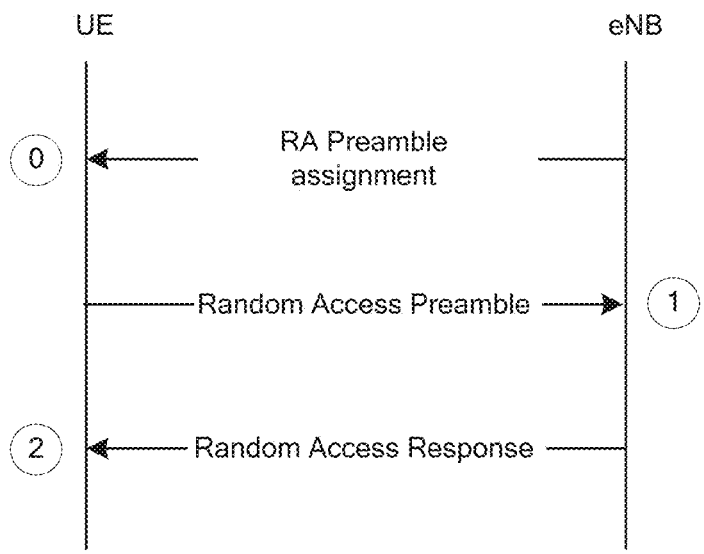
FIG. 1d is a schematic flowchart of contention free random access.

Random Access (RACH) Procedure:

Currently, the RACH procedure is divided into a contention-based random access procedure and a contention free random access procedure. The contention-based random access procedure includes four steps of access: message 1 to message 4, as shown in FIG. 1c, and the contention free random access procedure includes only two steps of access: message 1 and message 2, as shown in FIG. 1d.

Message 1-4:

Message 2 of either contention-based random access or contention free random access is sending a Random Access Response (RAR). UE monitors, in an RAR window, an RAR corresponding to a Random Access Radio Network Temporary Identity (RA-RNTI).

In the contention-based random access, there is a problem that the UE may send a same preamble to same PRACH resources. Therefore, after receiving message 2, the UE further needs to send message 3 based on a UL grant in message. In addition, the UE may carry an identifier of the UE on message 3, and start a contention resolution timer simultaneously when sending message 3. Before the contention resolution timer times out, if the UE receives message 4 sent by a base station, contention resolution by the UE succeeds. The base station may carry the identifier of the UE in message. The UE can determine, based on the identifier of the UE carried in message 4, whether it is a message 4 thereof, thereby determining whether the contention succeeds.

Further, in order to shorten a delay of the access system, 2-step RACH is introduced, that is, a RACH procedure that includes two steps: the terminal sends message A to the network side, and then receives message B sent by the network side. Message A includes functions of message 1 or functions of message 1 and message 3, and message B includes functions of message 2 or functions of message 2 and message 4.

With reference to the accompanying drawings, the random access method provided in the embodiments of this application is described in detail by using specific embodiments and application scenarios.

Figure 2:
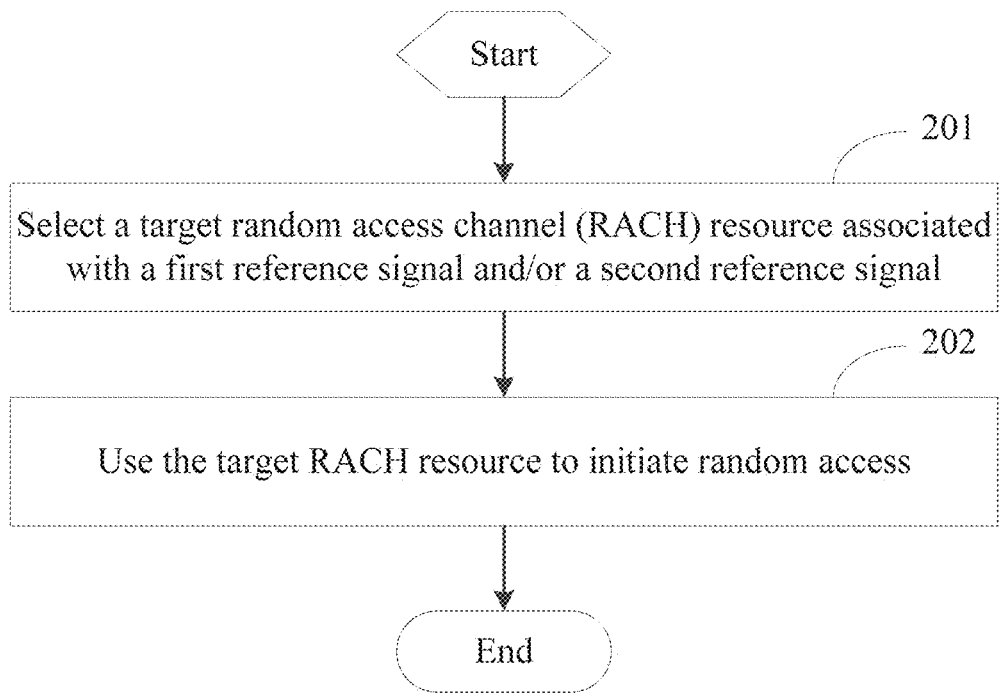
FIG. 2 is a schematic flowchart of a random access method according to an embodiment of this application.

Referring to FIG. 2, an embodiment of this application provides a random access method, performed by a terminal, and the method includes the following steps.

Step 201: Select a target random access channel (RACH) resource associated with a first reference signal and/or a second reference signal.

Step 202: Use the target RACH resource to initiate random access.

In some embodiments of this application, the first reference signal is an SFN specific (which may be referred to as SFN specific or SFN super cell specific) reference signal, and the second reference signal is a cell/TRP specific reference signal. Accordingly, an SFN specific cell may be referred to as an SFN layer cell, and a cell/TRP specific cell may be referred to as a cell/TRP layer cell.

In some embodiments, in actual deployment, the SFN is a range of a super cell, which includes several cells or TRPs, and the SFN super cell is usually referred to as an SFN layer. A cell corresponding to the super cell or the SFN layer is the SFN specific cell; while several cells or TRPs included within a range of the SFN are cells/TRP layers or cells or TRPs within the range of the SFN. The cell/TRP corresponding to this layer is the cell/TRP specific cell/TRP. Accordingly, a reference signal (RS), system information (SI), paging, and the like at the SFN layer are all referred to as the SFN specific RS, SI, paging, and the like. A reference signal (RS), system information (SI), paging, and the like at the cell/TRP layer are all referred to as the cell/TRP specific RS, SI, paging, and the like.

Some of the foregoing terms are described first:

Cell/TRP specific: that is, the related configuration corresponding to each cell/TRP is independent. The configuration is the same within the cell/TRP range.

SFN/super cell specific: that is, the related configuration corresponding to each SFN/super cell is independent. The configuration is the same within the SFN/super cell range.

It should be noted that there may be several types of first reference signals and second reference signals, for example, the reference signal may be an SSB, namely, an SFN specific SSB and a cell/TRP specific SSB, and the reference signal may also be a Channel-State Information reference Signal (CSI-RS), a Cell Reference Signal (CRS), a Sounding Reference Signal (SRS), a Demodulation Reference Signal (DMRS), and other types of reference signals.

In some implementations, when the network is deployed with high frequency and low frequency ranges, the SFN specific cell includes a cell at the low frequency range, and the cell/TRP specific cell includes a cell at the high frequency range; or when the network includes a satellite communication network (satellite or HAPS), the SFN specific cell includes a High Altitude Platform Station (HAPS) cell or a GEO satellite cell, and the cell/TRP specific cell includes an LEO satellite cell or a cell covered by a ground base station.

In some embodiments of this application, when the SFN specific reference signal has an associated RACH resource, the RACH resource is shared by all cells/TRPs within the range of the SFN (super cell).

The terminal selects a target RACH resource, the target RACH resource is a RACH resource associated with the SFN specific reference signal and/or the cell/TRP specific reference signal, and the terminal initiates random access by using the target RACH resource.

In some embodiments, the existing RACH resource configuration and random access method may be used for the case that the terminal uses the RACH resource associated with the cell/TRP specific reference signal. Details are not described herein.

For the case that the terminal uses the RACH resource of the SFN specific SSB reference signal, namely, when the target RACH resource is a RACH resource associated with the first reference signal, the target RACH resource is configured by using SFN specific system information or cell/TRP specific system information.

Further, in some implementations, that the terminal selects a target random access channel (RACH) resource associated with a first reference signal and/or a second reference signal includes at least one of the following.

(1) Select the Target RACH Resource According to a Preset Priority Criterion:

In some embodiments of this application, the selecting the RACH resource according to a preset priority criterion includes:

a. Select a RACH resource associated with the first reference signal preferentially, namely, the RACH resource associated with the SFN specific reference signal is preferred;

b. Select a Contention Free Random Access (CFRA) RACH resource preferentially, namely, the CFRA RACH resource is preferred;

c. Select a RACH resource associated with the second reference signal preferentially, namely, the RACH resource associated with the cell/TRP specific reference signal is preferred; and d. Select the target RACH resource based on a preset priority order, namely, it is equivalent to a combination of Mode a and Mode b. In some embodiments, the CFRA RACH resource associated with the SFN specific reference signal is prior to the CFRA RACH resource associated with the cell/TRP specific reference signal, which is prior to the CBRA RACH resource associated with the SFN specific reference signal, which is prior to the CBRA RACH resource associated with the cell/TRP specific reference signal.

(2) Select the Target RACH Resource Based on a Measurement Result of the First Reference Signal and/or a Measurement Result of the Second Reference Signal:

In some embodiments of this application, the measurement result includes at least one of a Reference Signal Receiving Power (RSRP), Reference Signal Receiving Quality (RSRQ), a Signal to Interference plus Noise Ratio (SINR), a Received Signal Strength Indication (RSSI), or the like measured for the reference signal, and selecting the RACH resource based on the measurement result includes:

e. When the measurement result of the first reference signal is higher than a first threshold, select the RACH resource associated with the first reference signal, and in some embodiments, select any RACH resource corresponding to a reference signal with a measurement result higher than the first threshold; or when the measurement result of the first reference signal is not higher than a second threshold, select the RACH resource associated with the second reference signal;

Further, Mode e can be combined with the foregoing preset priority criteria, that is, combined with Mode a to Mode d:

e+a: In the RACH resource corresponding to the reference signal with a measurement result higher than the first threshold, the RACH resource associated with the SFN specific reference signal is preferred:

e+b: In the RACH resource corresponding to the reference signal with a measurement result higher than the first threshold, the CFRA RACH resource is preferred;

e+c: In the RACH resource corresponding to the reference signal with a measurement result higher than the first threshold, the RACH resource associated with the cell/TRP specific reference signal is preferred;

e+d: In the RACH resource corresponding to the reference signal with a measurement result higher than the first threshold, select the target RACH resource based on a preset priority order. In some embodiments, the CFRA RACH resource associated with the SFN specific reference signal is prior to the CFRA RACH resource associated with the cell/TRP specific reference signal, which is prior to the CBRA RACH resource associated with the SFN specific reference signal, which is prior to the CBRA RACH resource associated with the cell/TRP specific reference signal;

f. When the measurement result of the second reference signal is higher than a third threshold, select the RACH resource associated with the second reference signal; or when the measurement result of the second reference signal is not higher than a fourth threshold, select the RACH resource associated with the first reference signal, g. When a difference between a measurement result of a third reference signal and a measurement result of a fourth reference signal is higher than a fifth threshold, select a RACH resource associated with the third reference signal, where the fifth threshold is greater than or equal to 0, the third reference signal is the first reference signal or the second reference signal, and the fourth reference signal is the first reference signal or the second reference signal;

In some embodiments of this application, the third reference signal and the fourth reference signal may be of the same type, for example, the third reference signal and the fourth reference signal are both the cell/TRP specific reference signal or are both the SFN specific reference signal; the third reference signal and the fourth reference signal may also be of different types, for example, the third reference signal is the cell/TRP specific reference signal, the fourth reference signal is the SFN specific reference signal, or the third reference signal is the SFN specific reference signal, and the fourth reference signal is the cell/TRP specific reference signal.

h. Select a RACH resource associated with a reference signal with a highest measurement result between the first reference signal and the second reference signal;

In some embodiments of this application, a RACH resource corresponding to a reference signal with a best measurement result is selected, that is, the cell/TRP specific reference signal and the SFN specific reference signal are put together to compare and select the best one.

(3) Select the Target RACH Resource Based on a Time Domain, a Frequency Domain, or a Space Domain:

In some embodiments of this application, the selecting the RACH resource based on a time domain, a frequency domain, or a space domain includes:

i. Select a RACH resource associated with a target reference signal, where the target reference signal is a latest received reference signal before random access is initiated;

In some embodiments of this application, a RACH resource associated with a latest one reference signal before initiating the RACH is selected; and in some embodiments, the latest reference signal may be the first reference signal or the second reference signal.

Further, a latest received reference signal with a measurement result greater than the first threshold before initiating random access is selected, that is, a RACH resource associated with a latest reference signal with a measurement result higher than the first threshold is selected.

(4) Select the Target RACH Resource Based on a Type of the Terminal or a State of the Terminal or a Type of Service:

In some embodiments of this application, selecting based on a type of the terminal, different states of the terminal, a service type, and the like includes:

j. Different SFN specific reference signals or cell/TRP specific reference signals corresponding to different terminal types or service types.

For example, the terminal type supporting the SFN SSB (priority) uses the RACH resource corresponding to the SFN specific reference signal. For another example, the terminal (priority) in a state camped (camp) on the SFN super cell uses the RACH resource corresponding to the SFN specific reference signal.

In some implementations, the foregoing modes may be further combined:

For example, a CFRA RACH resource corresponding to a reference signal with a measurement result higher than the first threshold, a measurement result of the SSB specific reference signal higher than a measurement result of the cell/TRP specific reference signal, and a difference thereof greater than the second threshold is selected.

In some implementations, when there are both the first reference signal and the second reference signal, the method further includes: when a measurement result of the first reference signal is lower than a preset reference threshold, receiving or measuring the second reference signal. That is, if the measurement result of the SFN specific reference signal is lower than a specific reference threshold, the cell/TRP specific reference signal is received or measured.

In some implementations, when there are both the first reference signal and the second reference signal, the method further includes: before random access is initiated, receiving SFN specific system information and/or cell/TRP specific system information; and/or before random access is initiated, receiving or measuring the second reference signal. That is, before the RACH, the terminal always receives SFN specific and/or cell/TRP specific SI, and/or before the RACH, the terminal always receives or measures the cell specific reference signal.

In some implementations, the configuration of the RACH resource corresponding to the SFN specific reference signal may be one of the following:

Configuration information is included in the SFN specific SI or the cell/TRP specific SI.

1. RACH resources of all cells within a range of the SFN are the same, and are configured by the SFN specific system information, or same content is configured by the cell/TRP specific system information.

Further, when the SFN changes or a cell within a range of the SFN changes during a RACH procedure, the RACH procedure is continued to be executed based on a RACH resource associated with the SFN specific reference signal. That is, if there is an SFN (super cell) change or a cell change between SFNs (super cell) during the RACH procedure, including cell reselection or handover (synchronous reconfiguration), and the like, the RACH procedure based on the SFN specific reference signal is continued.

2. RACH resources of all cells within a range of the SFN are independent, and are configured by the SFN specific system information or separately configured by the cell/TRP specific system information.

Further, when the SFN changes or a cell within a range of the SFN changes during a RACH procedure, the RACH procedure is interrupted, or the RACH procedure is restarted based on a RACH resource associated with the SFN specific reference signal. That is, the RACH of all cells/TRPs within the range of the SFN is individual, namely, configured within a range of the SFN super cell, but RACH resources of each cell/TRP may be different. In some embodiments, the corresponding configuration is configured in the SFN specific SI (all cells/TRPs within the range of the SFN super cell need to be configured), or all pieces of cell/TRP specific SI are separately configured. If there is an SFN (super cell) change or a cell change between SFNs (super cell) during the RACH procedure, including cell reselection or handover (synchronous reconfiguration), and the like, the RACH procedure based on the SFN SSB is interrupted or restarted.

Further, the method further includes:

before preamble transmission, in a case that a cell within a range of the SFN changes, receiving cell/TRP specific system information; or before preamble transmission, in a case that the SFN changes or a cell between SFNs changes, receiving SFN specific system information.

It should be noted that an execution subject of the random access method provided in some embodiments of this application may be a random access apparatus, or a control module configured to execute the random access method in the random access apparatus. In some embodiments of this application, the random access apparatus provided in some embodiments of this application is described by using an example in which the random access method is implemented by the random access apparatus.

Figure 3:
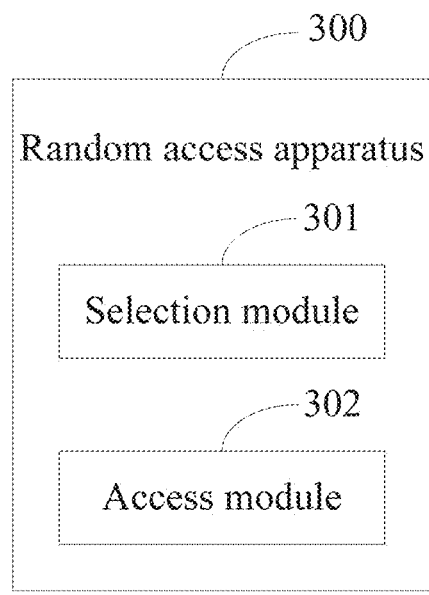
FIG. 3 is a schematic structural diagram of a random access apparatus according to an embodiment of this application.

Referring to FIG. 3, an embodiment of this application provides a random access apparatus 300, where the apparatus is applied to a terminal and includes:

a selection module 301, configured to select a target random access channel (RACH) resource associated with a first reference signal and/or a second reference signal; and an access module 302, configured to use the target RACH resource to initiate random access, where the first reference signal is a single frequency network (SFN) specific reference signal, and the second reference signal is a cell/transmission reception point (cell/TRP) specific reference signal.

In some implementations, when the target RACH resource is a RACH resource associated with the first reference signal, the target RACH resource is configured by using SFN specific system information or cell/TRP specific system information.

In some implementations, the selection module is further configured for at least one of the following:

selecting the target RACH resource according to a preset priority criterion;

selecting the target RACH resource based on a measurement result of the first reference signal and/or a measurement result of the second reference signal;

selecting the target RACH resource based on a time domain, a frequency domain, or a space domain; or selecting the target RACH resource based on a type of the terminal or a state of the terminal or a type of service.

In some implementations, the selection module is further configured for at least one of the following:

selecting a RACH resource associated with the first reference signal preferentially;

selecting a contention free random access (CFRACH) resource preferentially, selecting a RACH resource associated with the second reference signal preferentially; or selecting the target RACH resource based on a preset priority order.

In some implementations, the selection module is further configured for at least one of the following:

when the measurement result of the first reference signal is higher than a first threshold, selecting the RACH resource associated with the first reference signal; or when the measurement result of the first reference signal is not higher than a second threshold, selecting the RACH resource associated with the second reference signal;

when the measurement result of the second reference signal is higher than a third threshold, selecting the RACH resource associated with the second reference signal; or when the measurement result of the second reference signal is not higher than a fourth threshold, selecting the RACH resource associated with the first reference signal;

when a difference between a measurement result of a third reference signal and a measurement result of a fourth reference signal is higher than a fifth threshold, selecting a RACH resource associated with the third reference signal, where the fifth threshold is greater than or equal to 0, the third reference signal is the first reference signal or the second reference signal, and the fourth reference signal is the first reference signal or the second reference signal; or selecting a RACH resource associated with a reference signal with a highest measurement result between the first reference signal and the second reference signal.

In some implementations, the selection module is further configured to:

select a RACH resource associated with a target reference signal, where the target reference signal is a latest received reference signal before random access is initiated.

In some implementations, the selection module is further configured to:

select a RACH resource associated with a target reference signal, where the target reference signal is a latest received reference signal before random access is initiated with a measurement result greater than a first threshold.

In some implementations, when there are both the first reference signal and the second reference signal, the apparatus further includes:

a first processing module, configured to: when a measurement result of the first reference signal is lower than a preset reference threshold, receive or measure the second reference signal.

In some implementations, when there are both the first reference signal and the second reference signal, the apparatus further includes:

a second processing module, configured to: before random access is initiated, receive SFN specific system information and/or cell/TRP specific system information; and/or before random access is initiated, receive or measure the second reference signal.

In some implementations, RACH resources of all cells within a range of the SFN are the same, and are configured by the SFN specific system information, or same content is configured by the cell/TRP specific system information.

In some implementations, the access module is further configured to:

when the SFN changes or a cell within a range of the SFN changes during a RACH procedure, continue to execute the RACH procedure based on a RACH resource associated with the SFN specific reference signal.

In some implementations, RACH resources of all cells within a range of the SFN are independent, and are configured by the SFN specific system information or separately configured by the cell/TRP specific system information.

In some implementations, the access module is further configured to:

when the SFN changes or a cell within a range of the SFN changes during a RACH procedure, interrupt the RACH procedure, or restart the RACH procedure based on a RACH resource associated with the SFN specific reference signal.

In some implementations, the apparatus further includes: a second processing module, configured to: before preamble transmission, in a case that a cell within a range of the SFN changes, receive cell/TRP specific system information; or before preamble transmission, in a case that the SFN changes or a cell between SFNs changes, receive SFN specific system information.

In some implementations, when the network is deployed with a high frequency range and a low frequency range, an SFN specific cell includes a cell at the low frequency range, and a cell/TRP specific cell includes a cell at the high frequency range;

or when the network includes a satellite communication network, an SFN specific cell includes a HAPS cell or a GEO satellite cell, and a cell/TRP specific cell includes an LEO satellite cell or a cell covered by a ground base station.

In the embodiments of this application, random access is initiated by using the RACH resource associated with the SFN specific reference signal and/or the cell/TRP specific reference signal, which can realize fast access of the RACH and effectively reduce power consumption of the terminal.

The random access apparatus in some embodiments of this application may be an apparatus, or may be a component, an integrated circuit, or a chip in a terminal. The apparatus may be a mobile terminal, or a non-mobile terminal. For example, the mobile terminal may include, but is not limited to, a type of the terminal listed above. The non-mobile terminal may be a server, a Network Attached Storage (NAS), a personal computer (PC), a television (TV), a teller machine, or a self-service machine. This is not specifically limited in embodiments of this application.

The random access apparatus in some embodiments of this application may be an apparatus with an operating system. The operating system may be an Android operating system, may be an iOS operating system, or may be another possible operating system, which is not specifically limited in the embodiments of this application.

Figure 4:
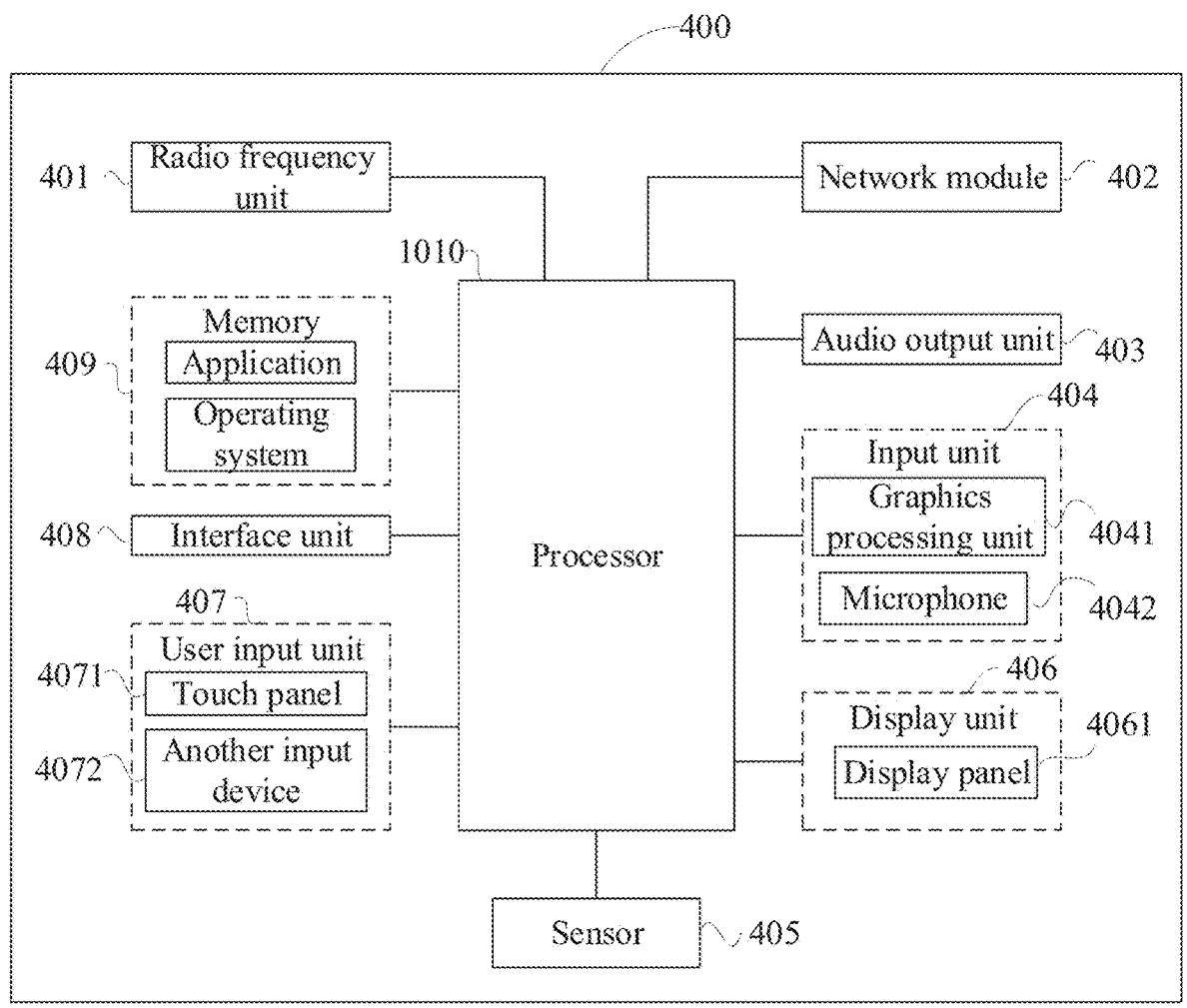
FIG. 4 is a schematic structural diagram of a terminal according to an embodiment of this application.

FIG. 4 is a schematic structural diagram of hardware of a terminal according to an embodiment of this application.

The terminal 400 includes but is not limited to components such as a radio frequency unit 401, a network module 402, an audio output unit 403, an input unit 404, a sensor 405, a display unit 406, a user input unit 407, an interface unit 408, a memory 409, and a processor 410.

A person skilled in the art can understand that the terminal 400 may further include a power supply (such as a battery) that supplies power to each component. The power supply may be logically connected to the processor 410 by using a power supply management system, to implement functions such as charging and discharging management, and power consumption management by using the power supply management system. The terminal structure shown in FIG. 4 constitutes no limitation on the terminal, and the terminal may include more or fewer components than those shown in the figure, or combine some components, or have different component arrangements. Details are not described herein.

It should be understood that, in some embodiments of this application, the input unit 404 may include a Graphics Processing Unit (GPU) 4041 and a microphone 4042, and the graphics processing unit 4041 processes image data of a still picture or a video obtained by an image capture apparatus (such as a camera) in a video capture mode or an image capture mode. The display unit 406 may include a display panel 4061, and the display panel 4061 may be configured in a form of a liquid crystal display, an organic light-emitting diode, or the like. The user input unit 407 includes a touch panel 4071 and another input device 4072. The touch panel 4071 is also referred to as a touchscreen. The touch panel 4071 may include two parts: a touch detection apparatus and a touch controller. The another input device 4072 may include but is not limited to a physical keyboard, a functional button (such as a volume control button or a power on/off button), a trackball, a mouse, and a joystick. Details are not described herein.

In some embodiments of this application, the radio frequency unit 401 receives downlink data from a radio access network side device and then sends the downlink data to the processor 410 for processing; and sends uplink data to the radio access network side device. Usually, the radio frequency unit 401 includes but is not limited to an antenna, at least one amplifier, a transceiver, a coupler, a low noise amplifier, a duplexer, and the like.

The memory 409 may be configured to store a software program or an instruction and various data. The memory 409 may mainly include a program or instruction storage area and a data storage area. The program or instruction storage area may store an operating system, and an application or an instruction required by at least one function (for example, a sound playing function or an image playing function). In addition, the memory 409 may include a high-speed random access memory, and may further include a non-volatile memory. The non-volatile memory may be a Read-Only Memory (ROM), a Programmable ROM (PROM), an Erasable PROM (EPROM), an Electrically EPROM (EEPROM), or a flash memory, for example, at least one disk storage component, a flash memory component, or another non-volatile solid-state storage component.

The processor 410 may include one or more processing units. In some embodiments, an application processor and a modem processor may be integrated into the processor 410. The application processor mainly processes an operating system, a user interface, an application, an instruction, or the like. The modem processor mainly processes wireless communications, for example, a baseband processor. It can be understood that, in some embodiments, the modem processor may not be integrated into the processor 410.

The processor 410 is configured to select a target random access channel (RACH) resource associated with a first reference signal and/or a second reference signal, and
  the processor 410 is further configured to use the target RACH resource to initiate random access, where
  the first reference signal is a single frequency network (SFN) specific reference signal, and the second reference signal is a cell/transmission reception point (cell/TRP) specific reference signal.

In some embodiments, when the target RACH resource is a RACH resource associated with the first reference signal, the target RACH resource is configured by using SFN specific system information or cell/TRP specific system information.

In some embodiments, the processor 410 is further configured for at least one of the following:
  selecting the target RACH resource according to a preset priority criterion;
  selecting the target RACH resource based on a measurement result of the first reference signal and/or a measurement result of the second reference signal;
  selecting the target RACH resource based on a time domain, a frequency domain, or a space domain; or
  selecting the target RACH resource based on a type of the terminal or a state of the terminal or a type of service.

In some embodiments, the processor 410 is further configured for at least one of the following:
  selecting a RACH resource associated with the first reference signal preferentially;
  selecting a contention free random access (CFRACH) resource preferentially,
  selecting a RACH resource associated with the second reference signal preferentially; or
  selecting the target RACH resource based on a preset priority order.

In some embodiments, the processor 410 is further configured for at least one of the following:
  when the measurement result of the first reference signal is higher than a first threshold, selecting the RACH resource associated with the first reference signal; or when the measurement result of the first reference signal is not higher than a second threshold, selecting the RACH resource associated with the second reference signal;
  when the measurement result of the second reference signal is higher than a third threshold, selecting the RACH resource associated with the second reference signal; or when the measurement result of the second reference signal is not higher than a fourth threshold, selecting the RACH resource associated with the first reference signal;
  when a difference between a measurement result of a third reference signal and a measurement result of a fourth reference signal is higher than a fifth threshold, selecting a RACH resource associated with the third reference signal, where the fifth threshold is greater than or equal to 0, the third reference signal is the first reference signal or the second reference signal, and the fourth reference signal is the first reference signal or the second reference signal; or
  selecting a RACH resource associated with a reference signal with a highest measurement result between the first reference signal and the second reference signal.

In some embodiments, the processor 410 is further configured to:
  select a RACH resource associated with a target reference signal, where the target reference signal is a latest received reference signal before random access is initiated.

In some embodiments, the processor 410 is further configured to:
  select a RACH resource associated with a target reference signal, where the target reference signal is a latest received reference signal before random access is initiated with a measurement result greater than a first threshold.

In some embodiments, when there are both the first reference signal and the second reference signal, the processor 410 is further configured to: when a measurement result of the first reference signal is lower than a preset reference threshold, receive or measure the second reference signal.

In some embodiments, when there are both the first reference signal and the second reference signal, the processor 410 is further configured to: before random access is initiated, receive SFN specific system information and/or cell/TRP specific system information; and/or before random access is initiated, receive or measure the second reference signal.

In some embodiments, RACH resources of all cells within a range of the SFN are the same, and are configured by the SFN specific system information, or same content is configured by the cell/TRP specific system information.

In some embodiments, the processor 410 is further configured to:

when the SFN changes or a cell within a range of the SFN changes during a RACH procedure, continue to execute the RACH procedure based on a RACH resource associated with the SFN specific reference signal.

In some embodiments, RACH resources of all cells within a range of the SFN are independent, and are configured by the SFN specific system information or separately configured by the cell/TRP specific system information.

In some embodiments, the processor 410 is further configured to:

when the SFN changes or a cell within a range of the SFN changes during a RACH procedure, interrupt the RACH procedure, or restart the RACH procedure based on a RACH resource associated with the SFN specific reference signal.

In some embodiments, the processor 410 is further configured to: before preamble transmission, in a case that a cell within a range of the SFN changes, receive cell/TRP specific system information; or before preamble transmission, in a case that the SFN changes or a cell between SFNs changes, receive SFN specific system information.

In some embodiments, when the network is deployed with a high frequency range and a low frequency range, an SFN specific cell includes a cell at the low frequency range, and a cell/TRP specific cell includes a cell at the high frequency range; or when the network includes a satellite communication network, an SFN specific cell includes an HAPS cell or a GEO satellite cell, and a cell/TRP specific cell includes an LEO satellite cell or a cell covered by a ground base station.

An embodiment of this application further provides a readable storage medium, where the readable storage medium stores a program or an instruction, and when the program or the instruction is executed by a processor, the processes of the foregoing random access method embodiment are implemented, and a same technical effect can be achieved. To avoid repetition, details are not described herein again.

The processor is a processor in the terminal in the foregoing embodiment. The readable storage medium includes a computer-readable storage medium, such as a computer Read-only Memory (ROM), a Random Access Memory (RAM), a magnetic disk, or an optical disc.

An embodiment of this application further provides a chip, where the chip includes a processor and a communications interface, the communications interface is coupled to the processor, and the processor is configured to run a program or an instruction of a terminal to implement the method according to the first aspect or implement the processes of the foregoing random access method embodiment; or is configured to run a program or an instruction of a radio access network side device, to implement the processes of the foregoing random access method embodiment; or is configured to run a program or an instruction of a core network side device, to implement the processes of the foregoing random access method embodiment, and a same technical effect can be achieved. To avoid repetition, details are not described herein again.

It should be understood that the chip mentioned in some embodiments of this application may also be referred to as a system-level chip, a system chip, a chip system, or an on-chip system chip.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of this application essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of this application.

The embodiments of this application are described above with reference to the accompanying drawings, but this application is not limited to the above specific implementations, and the above specific implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. A random access method, performed by a terminal, comprising:

when there are both a first reference signal and a second reference signal, receiving or measuring the second reference signal when a measurement result of the first reference signal is lower than a preset reference threshold:

selecting a target random access channel (RACH) resource associated with the first reference signal or the second reference signal; and using the target RACH resource to initiate random access, wherein the first reference signal is a single frequency network (SFN) specific reference signal, and the second reference signal is a cell/transmission reception point (cell/TRP) specific reference signal.

2. The random access method according to claim 1, wherein when the target RACH resource is a RACH resource associated with the first reference signal, the target RACH resource is configured by using SFN specific system information or cell/TRP specific system information.

3. The random access method according to claim 1, wherein selecting the target RACH resource associated with the first reference signal or the second reference signal comprises at least one of the following:
  selecting the target RACH resource according to a preset priority criterion;
  selecting the target RACH resource based on the measurement result of the first reference signal or a measurement result of the second reference signal;
  selecting the target RACH resource based on a time domain, a frequency domain, or a space domain; or
  selecting the target RACH resource based on a type of the terminal or a state of the terminal or a type of service.

4. The random access method according to claim 3, wherein selecting the target RACH resource according to the preset priority criterion comprises at least one of the following:
  selecting a RACH resource associated with the first reference signal preferentially;
  selecting a contention free random access (CFRACH) resource preferentially;
  selecting a RACH resource associated with the second reference signal preferentially; or
  selecting the target RACH resource based on a preset priority order.

5. The random access method according to claim 3, wherein selecting the target RACH resource based on the measurement result of the first reference signal or the measurement result of the second reference signal comprises at least one of the following:
  when the measurement result of the first reference signal is higher than a first threshold, selecting the RACH resource associated with the first reference signal; or when the measurement result of the first reference signal is not higher than a second threshold, selecting the RACH resource associated with the second reference signal;
  when the measurement result of the second reference signal is higher than a third threshold, selecting the RACH resource associated with the second reference signal; or when the measurement result of the second reference signal is not higher than a fourth threshold, selecting the RACH resource associated with the first reference signal;
  when a difference between a measurement result of a third reference signal and a measurement result of a fourth reference signal is higher than a fifth threshold, selecting a RACH resource associated with the third reference signal, wherein the fifth threshold is greater than or equal to 0, the third reference signal is the first reference signal or the second reference signal, and the fourth reference signal is the first reference signal or the second reference signal; or
  selecting a RACH resource associated with a reference signal with a highest measurement result between the first reference signal and the second reference signal.

6. The random access method according to claim 3, wherein selecting the target RACH resource based on the time domain, the frequency domain, or the space domain comprises:
  selecting a RACH resource associated with a target reference signal, wherein the target reference signal is a latest received reference signal before random access is initiated.

7. The random access method according to claim 3, wherein selecting the target RACH resource based on the time domain, the frequency domain, or the space domain comprises:
  selecting a RACH resource associated with a target reference signal, wherein the target reference signal is a latest received reference signal before random access is initiated with a measurement result greater than a first threshold.

8. The random access method according to claim 1, further comprising:
  before random access is initiated, receiving SFN specific system information or cell/TRP specific system information; or
  before random access is initiated, receiving or measuring the second reference signal.

9. The random access method according to claim 2, wherein RACH resources of all cells within a range of the SFN are the same, and are configured by the SFN specific system information, or same content is configured by the cell/TRP specific system information.

10. The random access method according to claim 9, wherein when the SFN changes or a cell within the range of the SFN changes during a RACH procedure, the RACH procedure continues to be executed based on a RACH resource associated with the SFN specific reference signal.

11. The random access method according to claim 2, wherein RACH resources of all cells within a range of the SFN are independent, and are configured by the SFN specific system information or separately configured by the cell/TRP specific system information.

12. The random access method according to claim 11, wherein when the SFN changes or a cell within the range of the SFN changes during a RACH procedure, the RACH procedure is interrupted, or the RACH procedure is restarted based on a RACH resource associated with the SFN specific reference signal.

13. The random access method according to claim 11, further comprising:
  before preamble transmission, when a cell within the range of the SFN changes, receiving cell/TRP specific system information; or
  before preamble transmission, when the SFN changes or a cell between SFNs changes, receiving SFN specific system information.

14. The random access method according to claim 1, wherein:
  when the network is deployed with a high frequency range and a low frequency range, an SFN specific cell comprises a cell at the low frequency range, and a cell/TRP specific cell comprises a cell at the high frequency range;
  or
  when the network comprises a satellite communication network, an SFN specific cell comprises a high altitude platform station (HAPS) cell or a geosynchronous earth orbit (GEO) satellite cell, and a cell/TRP specific cell comprises a low earth orbit (LEO) satellite cell or a cell covered by a ground base station.

15. A terminal, comprising:
  a memory storing a computer program; and
  a processor coupled to the memory and configured to execute the computer program to perform operations comprising:
    when there are both a first reference signal and a second reference signal, receiving or measuring the second reference signal when a measurement result of the first reference signal is lower than a preset reference threshold;

selecting a target random access channel (RACH) resource associated with the first reference signal or the second reference signal; and using the target RACH resource to initiate random access, wherein the first reference signal is a single frequency network (SFN) specific reference signal, and the second reference signal is a cell/transmission reception point (cell/TRP) specific reference signal.

16. The terminal according to claim 15, wherein when the target RACH resource is a RACH resource associated with the first reference signal, the target RACH resource is configured by using SFN specific system information or cell/TRP specific system information.

17. The terminal according to claim 15, wherein selecting the target RACH resource associated with the first reference signal or the second reference signal comprises at least one of the following:

selecting the target RACH resource according to a preset priority criterion;

selecting the target RACH resource based on the measurement result of the first reference signal or a measurement result of the second reference signal;

selecting the target RACH resource based on a time domain, a frequency domain, or a space domain; or selecting the target RACH resource based on a type of the terminal or a state of the terminal or a type of service.

18. A non-transitory computer-readable storage medium, storing a computer program, wherein the computer program, when executed by a processor of a terminal, causes the processor to perform operations comprising:

when there are both a first reference signal and a second reference signal, receiving or measuring the second reference signal when a measurement result of the first reference signal is lower than a preset reference threshold:

selecting a target random access channel (RACH) resource associated with the first reference signal or the second reference signal; and using the target RACH resource to initiate random access, wherein the first reference signal is a single frequency network (SFN) specific reference signal, and the second reference signal is a cell/transmission reception point (cell/TRP) specific reference signal.

19. The non-transitory computer-readable storage medium according to claim 18, wherein when the target RACH resource is a RACH resource associated with the first reference signal, the target RACH resource is configured by using SFN specific system information or cell/TRP specific system information.

* * * * *